United States Patent [19]
Samson

[11] Patent Number: 5,557,459
[45] Date of Patent: Sep. 17, 1996

[54] OPTICAL CONVERGENCE ACCOMMODATION ASSEMBLY

[75] Inventor: Peter R. Samson, San Francisco, Calif.

[73] Assignee: Autodesk, Inc., Sausalito, Calif.

[21] Appl. No.: 330,208

[22] Filed: Oct. 27, 1994

[51] Int. Cl.⁶ .................................................. G02B 27/22
[52] U.S. Cl. ........................... 359/465; 359/462; 359/466
[58] Field of Search .................................... 359/462, 464, 359/466, 470, 471, 472, 473, 477, 630; 345/7, 114; 348/42, 51, 52

[56] References Cited

U.S. PATENT DOCUMENTS 5,086,354   2/1992   Bass et al. .............................. 359/462

OTHER PUBLICATIONS

"Head Mounted Display Study: What's Wrong With Your Head Mounted Display?" *Cyberedge Journal Monograph #3*, Sep./Oct. 1993, University Of Edinburgh And Cyberedge Journal, pp. 1–2.

Iovine, John, "Building A Head Mounted Display For The VR Environment Part 1", *Nuts And Volts Magazine*, Jul. 1994.

Primary Examiner—Paul M. Dzierzynski
Assistant Examiner—Audrey Chang
Attorney, Agent, or Firm—Michael J. Hughes; Bradley T. Sako; Raymond E. Roberts

[57] ABSTRACT

An optical convergence apparatus (10, 310) having a projection screen (12) with a plurality of display areas (14) for displaying a like plurality of images (16). The images (16) are viewed by a plurality of lens assemblies (18) placed between the projection screen (12) and the user's eye (20). Prisms (322) are optionally provided between the lens assemblies (18) and the user's eye (20) for directing the images (16) to the user's eye (20). A stereoscopic pair (424) of the optical convergence apparatus (10, 310) is provided to enable stereoscopic reference cues.

21 Claims, 3 Drawing Sheets

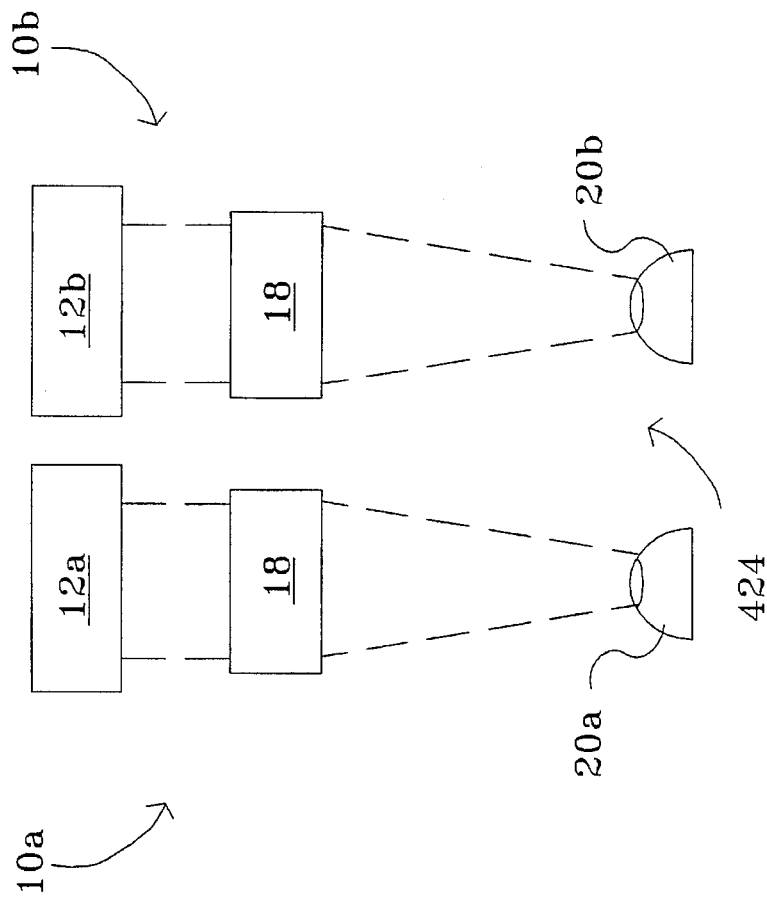
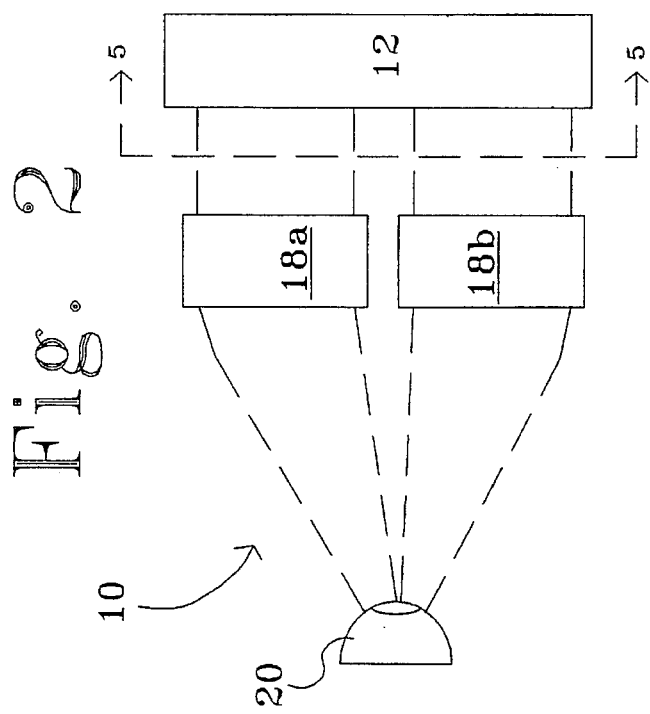

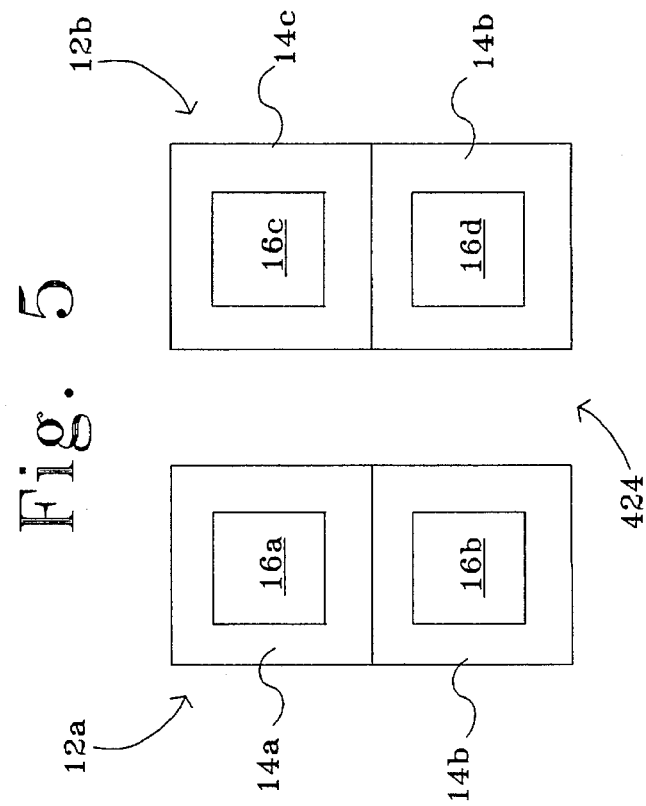
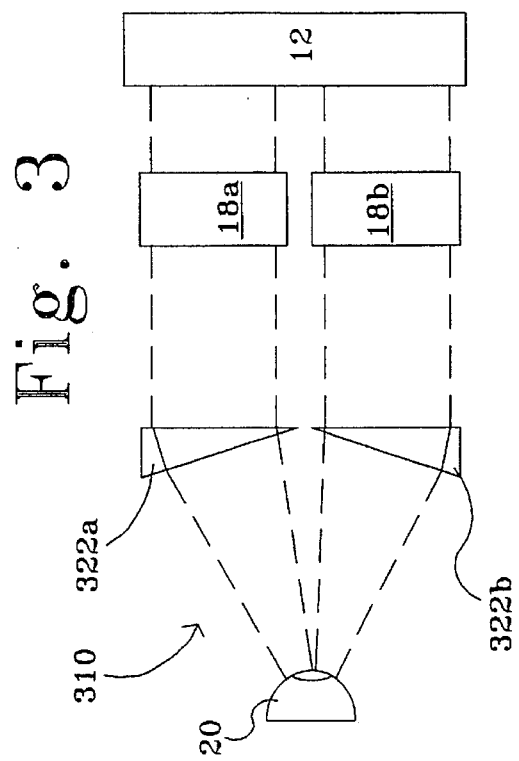
Fig. 5
Fig. 3

OPTICAL CONVERGENCE ACCOMMODATION ASSEMBLY

TECHNICAL FIELD

The present invention relates generally to the field of computer visual output display devices, and more particularly to an improved head mounted display. The predominant current usage of the optical convergence accommodation assembly is in the provision of visually perceptible images in virtual reality environments.

BACKGROUND ART

Head mounted displays ("HMD") are becoming increasingly widely used for virtual reality games and passive entertainment, "walk through" computer design and demonstration applications, and real time computer assisted machine control. The increasing use of HMD, and the likelihood of their ever greater application, has caused concern regarding possible health and safety complications of their use, and regarding the related question of operator comfort and efficiency over extended periods of use—regardless of whether or not any such potential discomfort might present a health or safety issue.

A prototype head mounted display using two small cathode ray tube ("CRT") screens viewed through prisms and magnifying optics was introduced in 1965. Known head mounted displays produced since that time have been modifications of this prototype device, having stereoscopic capabilities and relying on an assumption that two-dimensional ("2D") images can provide the user with an illusion of three-dimensional ("3D") space. Recent studies have shown that, while this assumption is not entirely incorrect, 3D space cannot be rendered with integrity from 2D images using conventional methods or means. Particular problems arise when a static stereogram having an illusion of the surfaces of a three dimensional object is replaced with a representation of a 3D world with objects at a full range of disparity increments, which objects and increments the observer must attempt to selectively discern.

A 1993 study at the Edinburgh Virtual Environment Laboratory, University of Edinburgh, has confirmed the effects of stress, blurred vision and nausea resulting from use of a conventional head mounted display in accomplishing a task wherein the wearer must rapidly discern objects both near and far in a virtual reality environment. That study concluded that, although dual/split screen presentations provide disparity cues that specify surfaces in depth, the image can only be seen clearly by accommodating (focusing) to the depth of the virtual screen image. A common focal setting for known head mounted displays is around 50 cm, and the physiology of focal accommodation to such relatively short focal lengths (or, for that matter, to any practical focal length given the other constraints of HMD's such as size, weight, cost, and the like) promotes a corresponding degree of convergence (rotation of the eyes inward). This convergence, coupled with any accompanying "proximal" convergence results in a prolonged vergence effort, which has been shown to be related to visual fatigue. Even if it were practical to do so, an attempt to move the virtual image out toward infinity in an effort to alleviate this problem would only amplify a second problem. That is, both accommodation and disparity give powerful cues for depth, and vergence (convergence and divergence) eye movements are psychologically linked and driven by both sources of information. It had been known previously that users of HMD devices must "learn" to decouple accommodation and convergence, but such decoupling can, at best, be only a transient state since the visuo-motor system will constantly struggle to respond to the differing inputs of blur and disparity. Eventually, a system breakdown is inevitable. In this respect, moving the virtual image toward infinity does not assist, because it merely increases the difference between blur-specified and disparity-specified depth clues when the user is studying near objects.

It would seem to be universally accepted that increased resolution would be a desirable improvement in future HMDs. The above referenced Edinburgh University study has also concluded that a reduction of visual stress should also be attained, and further that provision of a variable focal depth is the means for attaining that objective. The authors of the Edinburgh University study asserted that, "There are two approaches to the problem." The first of the only two approaches which were conceived as a result of this extensive study were either to "paint" the image so that rays specifying a given object require accommodation equivalent to the virtual depth of the object, as by using a very fast oscillating lens system, but a lens system which could adjust at the speed required for this approach is not presently feasible. The second approach suggested was to slave the HMD optics to movement of the user's eyes. A relatively slower lens system could be used for this approach. However, available accurate eye tracking systems are very cumbersome and expensive, whereas available smaller eye tracking systems have very poor stability. In addition, all available eye tracking systems have inevitable transmission delays, and the speed of eye movements can cause any such delay to be a significant problem.

Having concluded that both of the conceivable cures to the problem are not presently technologically feasible, the authors of the Edinburgh study suggested that a partial cure might be effected by setting various focal lengths which a user could manually choose, based upon whether he or she was observing near objects, far objects, or middle distance objects in the environment. An alternate suggested cure would be to forsake the stereoscopic system in favor a monoscopic system. However, the authors acknowledged that many applications require a stereoscopic system, as it is simply impossible to effectively simulate 3D space in a monoscopic system using known methods.

Clearly it would be advantageous to have a head mounted display apparatus which could provide realistically defined 3D images without the adverse side effects discussed above. To the inventor's knowledge, all prior art systems have either caused eye strain or other adverse effects, or else have provided less than ideal depth of field definition.

DISCLOSURE OF INVENTION

Accordingly, it is an object of the present invention to provide an optical display device which will produce realistic three dimensional images.

It is another object of the present invention to provide an optical display device which will reduce user eye vergence effort.

It is a further object of the present invention to provide an optical display device which can be made sufficiently small and light such that it can be configured as a head mounted display.

It is still another object of the present invention to provide an optical display in which accommodation and disparity perceptive clues are not disjointed.

It is a further object of the present invention to provide an optical display device which is relatively inexpensive to build and reliable in operation.

It is still another object of the present invention to exercise the user's eye accommodation during the use of an optical display device.

It is yet another object of the present invention to provide an optical display device which functions at a rate to avoid perceptible delays in depth accommodation parameters.

Briefly, the preferred embodiment of the present invention is a stereoscopic optical device having a separate display unit for each of the user's eyes. Each of the display units has a projection screen for producing an image. The projection screen is divided into two display portions and each of the display portions is focused toward the user's eye through corresponding optical assemblies. Each of the pair of optical assemblies associated with each projection screen focuses its respective display portion at different apparent focal distances. In the example of the best presently known embodiment of the invention, the two display portions are utilized to simulate scenes which are effectively at different respective distances from the viewer. In this manner, the user is presented with an approximated three dimensional image in which kinetic, disparity and accommodation distance cues are closely related.

An advantage of the present invention is that 3D space can be realistically simulated.

Yet another advantage of the present invention is that the user will not suffer undue fatigue or eye strain, even when the device is used for extended periods of time.

A further advantage of the present invention is that it exercises the user's eye accommodation while in use.

Still another advantage of the present invention is that it is can be made small and light enough to be used in a head mounted display.

Yet another advantage of the present invention is that it does not require expensive or overly complicated electronic or electro-mechanical adjustment or movement devices.

These and other objects and advantages of the present invention will become clear to those skilled in the art in view of the description of the best presently known mode of carrying out the invention and the industrial applicability of the preferred embodiment as described herein and as illustrated in the several figures of the drawing.

BRIEF DESCRIPTION OF THE DRAWINGS

FIG. 2 is a diagrammatic side elevational view of the optical convergence accommodation assembly of FIG. 2;

FIG. 3 is a diagrammatic side elevational view of an alternate embodiment of an optical convergence accommodation assembly, according to the present invention;

FIG. 4 is a top plan view depicting a stereoscopic pair of the optical convergence accommodation assemblies of FIG. 1, and FIG. 5 is a cross sectional view of the stereoscopic pair of the convergence accommodation assemblies of FIG. 2.

BEST MODE FOR CARRYING OUT THE INVENTION

Figure 1:
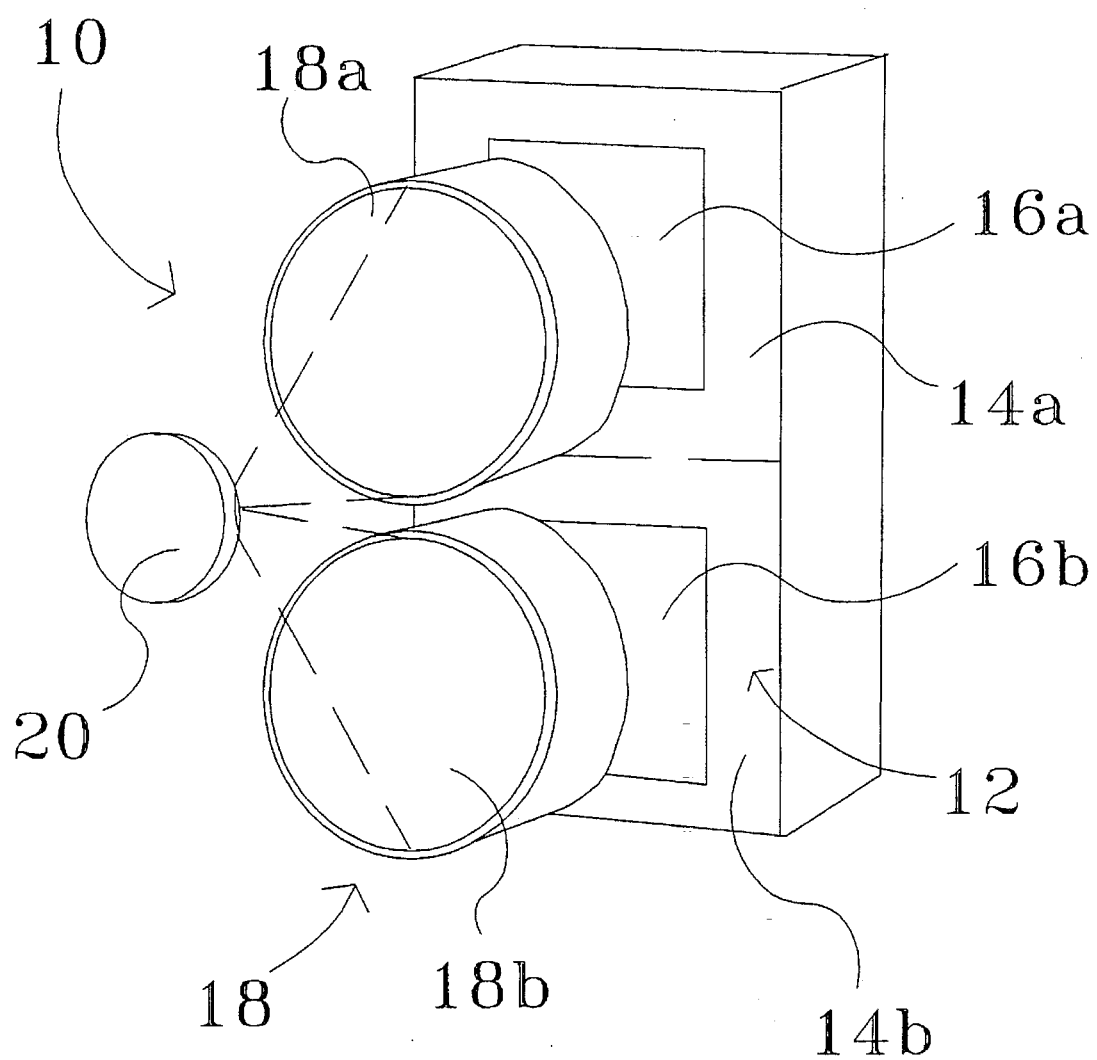
FIG. 1 is a diagrammatic perspective view of an optical convergence accommodation assembly, according to the present invention.

The best presently known mode for carrying out the invention is an optical display encompassing an optical convergence accommodation assembly. The predominant expected usage of the inventive optical convergence accommodation assembly is in the computer/multimedia industry, particularly in virtual reality presentations and activities wherein creation of a realistic three dimensional environment is desirable.

The convergence accommodation assembly of the presently preferred embodiment of the present invention is illustrated in a diagrammatic perspective view in FIG. 1 and is designated therein by the general reference character 10. The convergence accommodation assembly 10 has a projection screen 12 which is divided into a plurality (two, in the best presently known embodiment 10 of the present invention) of display areas 14 (a first display area 14a and a second display area 14b, in the best presently known embodiment 10 of the present invention).

The display areas 14a and 14b produce a separate first image 16a and a second image 16b, respectively, which images 16a and 16b are viewed through a lens set 18 having a corresponding plurality (two, in the best presently known embodiment 10 of the present invention) of lens assemblies 18 (a first lens assembly 18a and a second lens assembly 18b, in the best presently known embodiment 10 of the present invention).

FIG. 2 is a diagrammatic side elevational view of the best presently known embodiment 10 of the present invention. In the view of FIG. 2 it can be seen that a user's eye 20 can selectively look slightly upward toward the first lens assembly 18a or slightly downward toward the second lens assembly 18b to view the first image 16a (FIG. 1) or the second image 16b FIG. 1), respectively. FIG. 3 is a diagrammatic side elevational view of an equally preferred alternate embodiment 310 of the present invention. In the view of FIG. 3 it can be seen that, in contrast to best presently known embodiment 10 of the present invention as shown in FIG. 2, the equally preferred alternate embodiment 310 of the present invention has a first prism 322a and a second prism 322b for directing the output of the first lens assembly 18a and the second lens assembly 18b toward the user's eye 20.

In the best presently known embodiment 10 and the equally preferred alternate embodiment 310 of the present invention, the projection screen 12 is a liquid crystal display, although a cathode ray tube or other electronic visual display apparatus could be adapted for the purpose. The projection screen 12 of the best presently known embodiment 10 and the equally preferred alternate embodiment 310 of the present invention is a unitary device, with the display areas 14a and 14b (FIG. 1) being divided only in the sense that the computer (not shown), or other device producing the images 16, produces the first image 16a in the first (undivided) display area 14a and the second image 16b in the second (undivided) display area 14b. However, the invention could be practiced using electronically and physically distinct display areas 14a and 14b.

In the best presently known embodiment 10 and the equally preferred alternate embodiment 310 of the present invention, the lens assemblies 18 are complex lenses, known in the art, for focusing the images 16a and 16b on the eye 20 at differentiable apparent focal distances. It is, however, within the scope of the invention that a simple lens (not shown) might achieve the function of one or both of the lens assemblies 18.

FIG. 4 is a top plan view of a stereoscopic pair 424 of the inventive convergence assemblies 10. In the view of FIG. 4 it can be seen that there is a left convergence assembly 10a for a user's left eye 20a, and a right convergence assembly 10b for a user's right eye 20b. As can be appreciated in light of the discussion of the prior art, herein, it is expected that the inventive optical convergence mechanisms 10 will be configured as the stereo pair 424 in most applications.

FIG. 5 is a cross sectional view of the stereoscopic pair 424 of the convergence accommodation assemblies 10 taken along line 5—5 of FIG. 2. In the view of FIG. 5 it can be seen that the first projection screen 12, as previously discussed herein, has the first display area 14a and the second display area 14b for displaying the first image 16a and the second image 16b. Although the first projection screen 12a and the second projection screen 12b are physically alike, in the application of the stereoscopic pair 424 the second projection screen 12b is not bound to display identical images. Therefore, in the stereoscopic pair 424 of the convergence accommodation assemblies 10, the second projection screen 12b has a third display area 14c and a fourth display area 14d for displaying a third image 16c and a fourth image 16d, respectively. The usage of the different display areas 14a, 14b, 14c and 14d will be discussed hereinafter in relation to the industrial applicability of the invention.

Various modifications may be made to the invention without altering its value or scope. For example, the projection screen 12 could be divided into three or more display areas 14 to produce a corresponding number of images 16. However, this might only become practical as higher resolution projection screens 14 are developed, as increased division of a given projection screen 12 will sacrifice two dimensional resolution.

Another conceivable change is to eliminate the prisms 22 of FIG. 3 while retaining the advantages thereof by including appropriate image convergence means into the lens assemblies 18, as by making one or both of the lens assemblies 18 asymmetrical. Yet another conceivable change might be to use mirrors to redirect the optical paths, rather than the prisms 22.

Still other changes within the scope of the invention would be to arrange the display areas 14 side by side, rather than one above the other, as illustrated in relation to the best presently known embodiment 10 of the present invention and the equally preferred alternate embodiment 310. Yet another conceivable change would be to place the first display area 14a within the second display area 14b, with the second display area 14b framing the first display area 14a. Many other respective arrangements of the display areas 14 are possible.

Another change which might prove to be valuable would be to arrange the prisms 22 (or equivalent aspect of a variation of the invention) such that the images 16 are directed to be superimposed on the eye 20, rather than adjacent as discussed herein in relation to the best presently known embodiment 10 and the alternate embodiment 310 of the invention.

Still another likely modification would be to combine the lens assemblies 18 into a single assembly with different portions manufactured for different focal distances, in the manner of conventional bifocal lenses for eyeglasses.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

The optical convergence apparatus 10 and 310 of the present invention is intended for applications wherein objects or scenes at differing apparent distances are to be viewed in a computer generated display. The optical convergence apparatus 10 and 310 may be used in any application wherein conventional head mounted displays, or the like, are used to display such objects or scenes. The predominant current usages are for head mounted displays, particularly stereoscopic head mounted displays, wherein the effects of vergence disparity can be deleterious.

An example of an application of the inventive convergence accommodation assembly 10 and 310 would be in the virtual reality simulation of an automobile from the driver's perspective. The first image 16a could be that of the view as seem through the windshield of a car, while the second image 16b could be a view of the dashboard instruments. Although it is anticipated that the images 16a and 16b will be of different objects or scenes, it is within the scope of the invention, particularly where the images 16 might be superimposed on the user's eye 20, that the images might vary substantially only in that they are focused at a different real distances and projected at a correspondingly different apparent focal distances.

For the reasons discussed herein in relation to the prior art, it is anticipated that the inventive optical convergence accommodation apparatus 10 and 310 will find greatest acceptance in stereoscopic (binocular) head mounted displays, wherein 3D disparity cues are readily provided. As one skilled in the art will recognize, the head mounted display will likely be provided with a feedback mechanism for providing a controlling computer with information relating to the position of the head mounted display such that the images 16 can be modified and updated accordingly. Software for updating the images 16 is presently being developed at a prodigious rate, and it is not intended that the present invention be limited to operation in conjunction with existing software. Rather, it is anticipated that the inventive convergence accommodation apparatus 10 and 310 will be adapted for use with any future software wherein scenes of differing perceptual distances are to be displayed. Furthermore, it is anticipated that additional hardware may be used in conjunction with the inventive convergence accommodation apparatus 10 and 310 for providing additional and/or different perceptual cues. As will be recognized by one skilled in the art, perceptual cues discussed herein as being provided in hardware may eventually be developed such that one or more hardware components are replaced by software. Similarly, one or more software aspects of the images 16 may be better provided in hardware in some applications.

Referring again to FIG. 5, in the stereoscopic pair 424 of the convergence accommodation apparatus 10, a typical example of usage of the display areas 14a, 14b, 14c and would be to cause the first image 16a and the third image 16c to be alike with the exception of stereoscopic reference cues, while the second image 16b and the fourth image 16d would be different than the first image 16a and the third image 16c, but alike to each other with the exception of stereoscopic reference cues. Another arrangement might be to cause the four images 16a, 16b, 16c and 16d to all be, essentially, of the same scene, with the exception that the first image 16a and the third image 16c would be focused—by the corresponding lens sets 18 (FIG. 4)—at a different apparent focal distance and/or depth of field than are the second image 16b and the fourth image 16d. As in the first example given just previously here, in this example also the first image 16a and the third image 16c could be alike with the exception of stereoscopic reference cues, while the second image 16b and the fourth image 16d could be different than the first image 16a and the third image 16c, but alike to each other with the exception of stereoscopic reference cues.

Since the optical convergence accommodation apparatus 10 and 310 of the present invention may be readily constructed and are physically and electrically significantly similar to prior art conventional head mounted display image production means, it is expected that it will be acceptable in the industry as a substitute for the conventional image production means in many applications. For these and other reasons, it is expected that the utility and industrial applicability of the invention will be both significant in scope and long-lasting in duration.

What is claimed is:

1. A video display apparatus, comprising:
    a first image projection means having a first display area for producing a first image portion and a second display area for producing a second image portion, wherein the first image portion is a near field image and the second image portion is a far field image;
    an optical projection means having a first optical portion and a second optical portion, the first optical portion for projecting the first image portion toward a user's first eye and the second optical portion for projecting the second image portion toward the user's first eye.

2. The video display apparatus of claim 1, and further including:
    a second image projection means having a third display area for producing a third image portion and a fourth display area for producing a fourth image portion, wherein the third image portion is a near field image and the fourth image portion is a far field image;
    a second optical projection means having a third optical portion and a fourth optical portion, the third optical portion for projecting the third image portion toward a user's second eye and the fourth optical portion for projecting the fourth image portion toward the user's second eye.

3. The video display apparatus of claim 2, wherein:
    the first image and the third image are stereoscopically related images.

4. The video display apparatus of claim 2, wherein:
    said first image projection means and the second image projection means are video screens arranged such that said first image projection means is viewable by a user's first eye and the second image projection means is viewable by a user's second eye.

5. The video display apparatus of claim 1, wherein:
    said first image projection means is a cathode ray tube screen.

6. The video display apparatus of claim 1, wherein:
    said first image projection means is a liquid crystal display screen.

7. The video display apparatus of claim 1, wherein:
    the first display area is above the second display area.

8. A convergence accommodation apparatus for a head mounted display, comprising:
    a first display area for producing a first image, which is a near field image;
    a second display area for producing a second image, which is a far field image;
    a first lens assembly for focusing the first image toward an eye of the user;
    a second lens assembly for focusing the second image toward the eye of the user.

9. The convergence accommodation apparatus of claim 8, wherein:
    said first display area and said second display area are parts of a unitary display means.

10. The convergence accommodation apparatus of claim 9, wherein:
    the unitary display means is a cathode ray tube.

11. The convergence accommodation apparatus of claim 9, wherein:
    the unitary display means is a liquid crystal display.

12. The convergence accommodation apparatus of claim 8, wherein:
    said first display area and said second display area are undivided portions of a unitary display means.

13. The convergence accommodation apparatus of claim 8, and further including:
    a light redirecting means for redirecting the first image from the first lens assembly toward the eye of the user.

14. A computer video display, comprising:
    a first image creation means including a first plurality of video display areas for producing a first plurality of video images thereon;
    a first lens set including a first plurality of lens assemblies for focusing the first plurality of video images toward a first eye of the user;
    a second image creation means including a second plurality of video display areas for producing a second plurality of video images thereon;
    a second lens set including a second plurality of lens assemblies for focusing the second plurality of video images toward a second eye of the user.

15. The computer video display of claim 14, wherein:
    at least one of the lens assemblies is a simple lens.

16. The computer video display of claim 15, wherein:
    at least one of the lens assemblies is a complex lens assembly.

17. The computer video display of claim 14, wherein:
    the lens assemblies are dissimilar in that they focus the video images on the single eye of the user at different apparent distances.

18. The computer video display of claim 14, wherein:
    the lens set is configured such that the single eye of the user must move to look individually toward each of the plurality of lens assemblies to view the respective corresponding video images.

19. A video display apparatus, comprising:
    a first image projection means having a first display area for producing a first image portion and a second display area for producing a second image portion;
    a first optical projection means having a first optical portion and a second optical portion, the first optical portion for projecting the first image portion toward a user's first eye and the second optical portion for projecting the second image portion toward the user's first eye;
    a second image projection means having a third display area for producing a third image portion and a fourth display area for producing a fourth image portion;
    a second optical projection means having a third optical portion and a fourth optical portion, the third optical portion for projecting the third image portion toward a user's second eye and the fourth optical portion for projecting the fourth image portion toward the user's second eye.

20. The video display apparatus of claim 19, wherein:

the first image and the third image are stereoscopically related images.

21. The video display apparatus of claim 20, wherein: said first image projection means and the second image projection means are video screens arranged such that said first image projection means is viewable by a user's first eye and the second image projection means is viewable by a user's second eye.

* * * * *